United States Patent
De Los Aires Alvarez

(10) Patent No.: US 9,041,715 B2
(45) Date of Patent: May 26, 2015

(54) METHOD, SYSTEM AND COMPUTER PROGRAM FOR OBTAINING THE TRANSFORMATION OF AN IMAGE

(75) Inventor: Xavier De Los Aires Alvarez, Barcelona (ES)

(73) Assignee: MK VIRTUAL ADVERTISING, S.L., Barcelona (ES)

( * ) Notice: Subject to any disclaimer, the term of this patent is extended or adjusted under 35 U.S.C. 154(b) by 344 days.

(21) Appl. No.: 13/502,537

(22) PCT Filed: Oct. 19, 2010

(86) PCT No.: PCT/ES2010/000426
§ 371 (c)(1),
(2), (4) Date: May 7, 2012

(87) PCT Pub. No.: WO2011/048239
PCT Pub. Date: Apr. 28, 2011

(65) Prior Publication Data
US 2012/0212755 A1    Aug. 23, 2012

(30) Foreign Application Priority Data
Oct. 21, 2009   (ES) .................................. 200902058

(51) Int. Cl.
G06T 15/20    (2011.01)
G06T 3/00     (2006.01)
G09F 19/12    (2006.01)
G09F 19/22    (2006.01)

(52) U.S. Cl.
CPC . *G06T 15/20* (2013.01); *G06T 3/00* (2013.01); *G09F 19/12* (2013.01); *G09F 19/22* (2013.01); *G06T 3/0093* (2013.01)

(58) Field of Classification Search
None
See application file for complete search history.

(56) References Cited

U.S. PATENT DOCUMENTS
5,933,544 A  *  8/1999 Brown et al. ................. 382/276
2002/0176636 A1*  11/2002 Shefi ............................ 382/285
(Continued)

FOREIGN PATENT DOCUMENTS
DE   198 37 887 A1 *  2/2000  ............. G09F 19/12
EP   0883087   12/1998
EP   0599920   1/1999
EP   0968495   7/2001
EP   1193667   4/2002
(Continued)

*Primary Examiner* — Daniel Hajnik
(74) *Attorney, Agent, or Firm* — Sturm & Fix LLP

(57) ABSTRACT

The invention relates to a system for obtaining the transformation (30) of an image, said system comprising means for capturing or introducing a image proportions; means for capturing or introducing a width of the transformation; means for capturing or introducing a height of the virtual representation of the image; means for establishing or introducing coordinate axes at the point on the surface, onto which the viewing point is orthogonally projected; and comprising a computer equipped with a program for obtaining:
a first transformation angle ($\alpha$) from two parameters: the distance between the point on the surface onto which the viewing point is projected and the upper end furthest from the transformation; and the distance corresponding to the coordinate of the upper end furthest from the transformation in relation to said viewing point, and the distance corresponding to the coordinate of the upper end furthest from the transformation in relation to the viewing point;
a lateral transformation longitude (L3) from the first transformation angle and the transformation width;
a longitude (L4) of the transformation (30) from the captured proportions and height of the virtual representation;
a second transformation angle ($\lambda$) from two parameters: the distance between the point on the surface onto which the viewing point is projected and the lower end closest to the transformation; and the distance corresponding to the coordinate of the lower end closest to the transformation.

3 Claims, 8 Drawing Sheets

(56) References Cited

U.S. PATENT DOCUMENTS

2004/0035030 A1* 2/2004 Sondergaard .................. 40/453
2006/0117622 A1* 6/2006 Sondergaard .................. 40/596

FOREIGN PATENT DOCUMENTS

| NZ | 525129 | 9/2006 |
| WO | 2007119033 | 10/2007 |

* cited by examiner

METHOD, SYSTEM AND COMPUTER PROGRAM FOR OBTAINING THE TRANSFORMATION OF AN IMAGE

The invention herein relates to a system for obtaining the transformation (30) of an image (20), such that when said transformation is arranged on a surface forming a horizontal plane and is seen by an observer from at least one appropriate viewing point, a virtual representation of the image appears to be in a position perpendicular to the surface onto which the transformation is arranged.

The invention is applicable mainly in advertising media for sport arenas or commercial premises.

BACKGROUND TO THE INVENTION

Nowadays, the presence of advertising is becoming an integral part of our everyday lives. Advertising investments made by certain companies to enter what appear to be the most lucrative markets with the intention of obtaining greater profits, are endless.

Of these markets, the fastest growing sector in relation to advertising is the world of sports, to the point that the main item of revenue in club budgets is based on financial contributions from advertising.

Most of this advertising is arranged in the clubs sports facilities; even some sports arenas change their name depending on who the official sponsor of the club is. Among the advertising that can be found in a sports arena, the most relevant (and therefore which provides greater profits) is advertising which is arranged near or at the actual surface of the playing field, and which, in the event of a television broadcast in the sports arena, is seen by thousands or even millions of viewers.

Given everything described, advertising companies are constantly in search of new formulas that enable more efficient advertising.

For example, one of these formulas is based on arranging advertising on the surface of the playing field by means of canvas banners or similar directly on said surface, but the main drawback of this solution is that viewing the advertising is quite complex both for viewers and the spectators in the sports arena.

Another formula is based on arranging the advertising on vertical media around the playing field, enabling the proper viewing of advertising both for the attendees at the sporting event and spectators who are, for example, watching from home. Said solution has the disadvantage that sports men and women participating in the sporting event may suffer a minor accident if they hit or bump into said media, that is to say, said vertical media pose a risk to the physical safety of sports men and women. As this solution has evolved, vertical LEDs (Light Emitting Diodes) have been developed, where the advertising is carried out electronically, although the drawbacks are the same as those described for the previous solution.

Several solutions have been adopted from these drawbacks, based on the application of geometric techniques (more specifically, the geometry of perspective). Said solutions, applying methods for obtaining transformations of the advertising images to be shown, aim to simulate the presence of more or less vertical media from media arranged horizontally on the surface of the playing field in the sports arena. Therefore, these solutions draw together the advantages of advertising media arranged on the surface of the playing field (they do not pose a risk to the physical safety of the sports men and women) and those involving the vertical media (excellent visibility of the advertising, mainly for viewers).

One of these solutions is described in the European patent EP 0599920 B2, entitled "Applying an inverse perspective transformation of an image to a surface, for subsequent image pick-up" (in Spanish, "Aplicación de una transformación en perspectiva inversa de una imagen a una superficie, para tomar la imagen a continuación"). Said European patent describes a method for representing an image that is based on obtaining the transformation of the image from obtaining an inverse perspective transformation thereof and applying said transformation on the surface of the playing field, such that, when the transformation is seen along the line of vision which corresponds to the line of vision that has been used for the inverse perspective transformation, the image appears to be situated on a plane forming a right angle with the aforementioned line of vision, that is to say, the image is shown facing an appropriate observer (for example, a mobile image camera). Obviously, the line of vision is the one that is established between the observer and the image (it can be understood to be a virtual image).

As shown in FIG. 1, the main drawback of said solution is that, since an inverse perspective transformation of the image is performed, it is inherent to it that the baseline of the transformation 10 should be arranged perpendicular to the line of vision 11, as described in the European patent, which means that the space required to "apply" an inverse perspective transformation on the surface of the playing field (for example, if one is to be arranged at one of the ends of the surface of the playing field, close to the goals or baskets) should have relatively large dimensions and not all sports arenas do.

The European patent EP 0968495 B2, entitled "Figurative print and a plane print carrier and use of such figurative print" (in Spanish, "Cartel publicitario Impreso en un portacarteles plano y use de dicho cartel"), describes another possible solution for presenting advertising, for example, in a sports arena.

In said European patent document, figurative print comprising a first figurative element representing an advertisement in a first dimension and a second dimension is described, which, when seen in a given oblique direction between an observer and the figurative print, shows the first and second dimension forming an advertising plane that is directed obliquely forward, preferably perpendicular to the print carrier. Additionally, the figurative print further comprises a second figurative element cartel that represents the advertisement in a third dimension, such that when it is seen in a certain oblique direction between the observer and the figurative print, it displays the third dimension as directed perpendicularly to the figurative print plane.

The main advantage presented by said solution is the complexity of obtaining the figurative print or advertising medium. Basically, because the problem to be solved is that the figurative print should appear in the best way possible for a chosen observer, maintaining the appearance that the figurative print is a constituent part of the environment of other spectators, it is necessary for the second figurative element forms certain angles with the first dimension and the second dimension and that, in addition, the values of said angles are located at certain intervals. It is therefore essential that the advertising image to be displayed has three defined dimensions (x-y-z).

Furthermore, any of the solutions described that use transformations of the advertising images require the positions of the observer and the medium to be the same as those used to obtain the transformation of the image to be displayed.

Any movement by the observer (for example, a television camera) or the advertising medium in relation to the predefined position, causes the image to be displayed incorrectly.

DESCRIPTION OF THE INVENTION

From the above-described, it is an objective of the invention herein to provide a system for obtaining the transformation of an image in a simple and efficient manner.

A system for obtaining the transformation of an image is achieved easily and transformation is achieved regardless of the arrangement of the viewing point in relation to the vertical arrangement, that is to say, although the observer's position may differ from the vertical position, the virtual representation of the starting image can be viewed correctly (the virtual representation of the image will appear to be in a position perpendicular to the surface onto which the transformation is arranged).

According to another aspect, the invention uses a computer program comprising program instructions that are executed on a computer for obtaining the transformation of an image, Said computer program can be stored in physical storage media, such as recording media, a computer memory or read-only memory, can be carried by a carrier wave, such as an electrical or optical wave. Said storage means are not the object of the present invention.

According to the invention a system for obtaining the transformation of an image is provided, such that when said transformation is arranged on a surface that forms a horizontal plane and is seen by an observer on at least one appropriate viewing point, a virtual representation of the image appears to be in a position perpendicular to the surface onto which it is arranged, said system uses means for capturing or introducing a image proportions to be transformed, means for capturing or introducing a width the transformation of the image should have, means for capturing or introducing a height the virtual representation of the image should have; means for establishing or introducing coordinate axes at the point on the surface onto which the viewing point is orthogonally projected, with said coordinate axes on the same horizontal plane corresponding to the surface onto which the transformation of the image is arranged; and comprising a computer equipped with a program for obtaining a first transformation angle of the image from at least two of the following parameters: the distance between the point on the surface onto which the viewing point is projected and the upper end furthest from the transformation of the image in relation to the viewing point; the distance corresponding to the coordinate of the upper end furthest from the transformation of the image in relation to said viewing point, on a first axis of the coordinate axes; and the distance corresponding to the coordinate of the upper end furthest from the transformation of the image in relation to said viewing point, on a second axis of the coordinate axes; means for obtaining a lateral transformation length of the image from the first transformation angle of the image and the width the transformation of the image should have: means for obtaining a transformation length of the image from the captured proportion of the image and the captured height of the virtual representation of the image; means for obtaining a second transformation angle of the image from at least two of the following parameters: the distance between the point on the surface onto which the viewing point is projected and said lower end closest to the transformation of the image in relation to said viewing point; the distance corresponding to the coordinate of the lower end closest to the transformation of the image in relation to said viewing point, on the first axis of the coordinate axes; and the distance corresponding to the coordinate of the lower end closest to the transformation of the image in relation to said viewing point, on the second axis of the coordinate axes.

According to one embodiment of the invention, the observer is a television camera, making it possible to capture the transformation of the image such that the virtual representation thereof is shown to viewers, arranged perpendicular to the surface onto which the transformation is arranged. The The advertising medium obtained from said system could be arranged on, for example, the surface of a playing field in a sports arena, in any desired position, without requiring large dimensions for installment. Thus, it could be arranged on the lateral lines or at the end of the surface of the playing field, with the baseline of the medium (or transformation) arranged parallel to said lines. Similarly, the medium could also be arranged within the playing field itself (within the boundary lines of the playing field, for example, in the centre of the playing field).

Furthermore, the media obtained, apart from not posing a risk to the safety of the sports men or women, allow the cameras capturing an event that is being played on said playing field to also capture the transformation of the image, which would be seen by viewers, as well as a virtual representation of the image that is arranged perpendicular to the surface of the playing field.

Importantly, the correct display of the virtual representation does not depend on the height at which the camera is arranged; only the desired height of the virtual representation of the image should be considered.

According to this preferred embodiment of the invention, the medium onto which the transformation of the advertising image is printed is a canvas banner or similar, but could also be the actual surface of a playing field or similar (for example, the surface a commercial premises), i.e. the transformation would be printed directly onto the surface of the playing field.

Furthermore, the invention also relates to a system for obtaining an advertising medium, comprising the system for obtaining the transformation of an image described above, to obtain the transformation of an advertising image, and media to print the transformation of the advertising image onto a medium.

According to another aspect of the invention, an advertising medium is provided which comprises a transformation of an advertising image obtained from a system described above for obtaining a transformation of an image, and a medium onto which said transformation of the advertising image is printed.

BRIEF DESCRIPTION OF THE DRAWINGS

For a better understanding of what has been disclosed, drawings are attached in which, schematically and solely by way of non-limiting example, a practical embodiment is represented.

In the drawings.

DESCRIPTION OF PREFERRED EMBODIMENTS OF THE INVENTION

Figure 1:
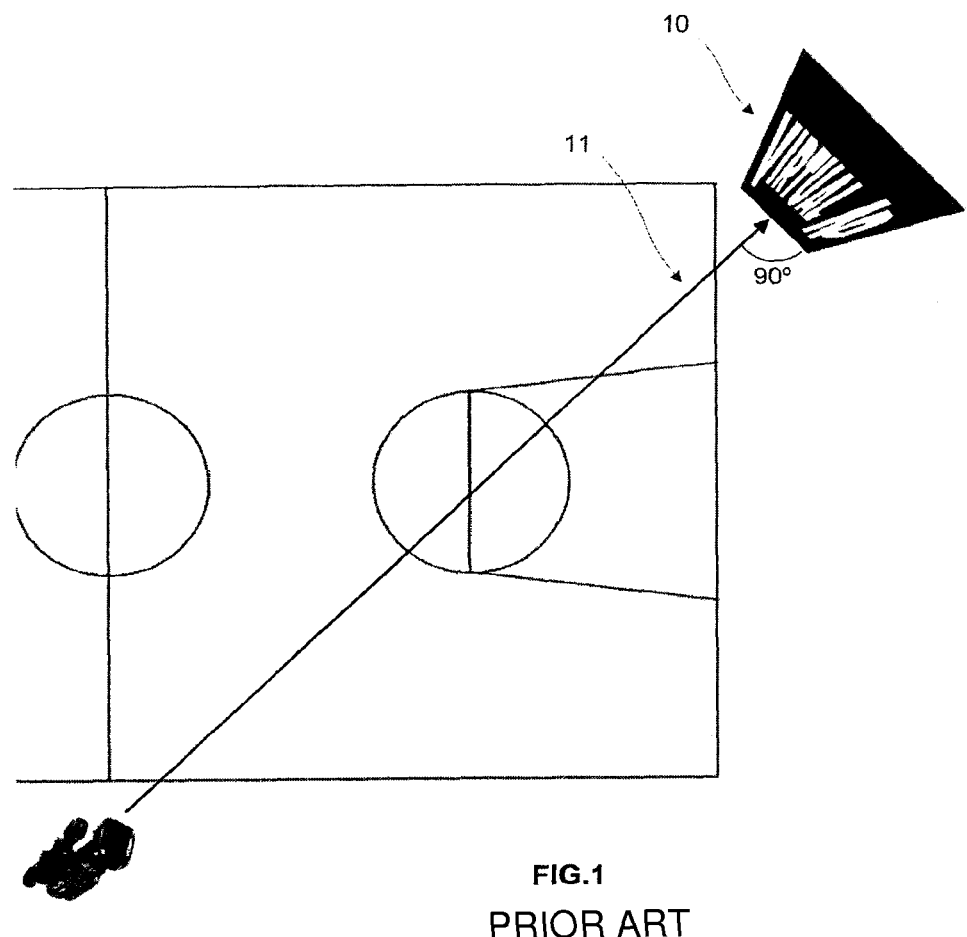
FIG. 1 is a schematic representation of an advertising medium solution or similar, according to the state of the art.

Hereinbelow a preferred embodiment of the system for obtaining a transformation of an image according to the invention is described, taking into account that the image is an advertising image and that said transformation should then be able to be used to obtain an advertising medium that should be arranged on the surface of a sports arena, more specifically on the surface of, for example, a basketball court.

In addition, in said preferred embodiment, the observer 31 is a television camera from which it is possible to broadcast a game that is taking place on the basketball court. The aim is that during said broadcast, when the advertising medium is captured by the television camera, the virtual representation of the advertising image appears in a position perpendicular to the surface of the playing field.

In the embodiment herein, the television camera is arranged centred in relation to one of the lateral lines of the basketball court (just where the halfway line meets the lateral line), at a certain distance from it, and at a certain height that depends on each sports arena (usually the television camera is arranged in the stands). As will be seen further on, obtaining the transformation of the advertising image does not depend on the height at which the television camera is arranged (that is to say, the observer 31); whatever height the camera is arranged at, the virtual representation of the advertising image will be viewed correctly.

At the point of the surface onto which the appropriate viewing point is orthogonally projected (regardless of the height at which the camera is arranged), two virtual orthogonal coordinate axes are arranged, with one axis (X axis) running in the same direction as the lateral lines of the playing field and the other axis (Y axis) running in the same direction as the halfway line or baselines.

Furthermore, the advertising medium obtained in the preferred embodiment herein is suitable to be arranged on the lateral side of the playing field opposite to where the camera is located and tilted to the right in relation thereto. More specifically, the upper end furthest from the transformation of the image in relation to the viewing point must be arranged on the extension of the playing field baseline. In addition, the advertising medium should be arranged at a predefined distance from the lateral line. Nonetheless, media may be obtained that could be arranged at other locations on the playing field such as on the left in respect of the camera or at the ends of the playing field (see FIG. 9).

The fact that the advertising medium is arranged on a basketball court and that the upper end furthest from the transformation of the image is arranged on the extension of the baseline of the court, enables some of the known distances to be taken advantage of, such as the width of the court or the distance between the midcourt line and baselines.

According to another characteristic of the preferred embodiment herein, the advertising medium is arranged with its baseline parallel to the lateral line of the playing field. Following, the system for obtaining a transformation of the image will be described, as shown by the advertising image 20 in FIG. 2. The system for obtaining said transformation of the advertising image uses a computer program responsible for, from some input parameters, obtaining output parameters which are required to obtain the transformation of the image. Said transformed image must be positioned over the horizontal surface, so that to the observer (31) (in this case a television camera) said transformed image appears apparently placed in a perpendicular position with respect to the horizontal surface (in this case the pitch).

Figure 5:
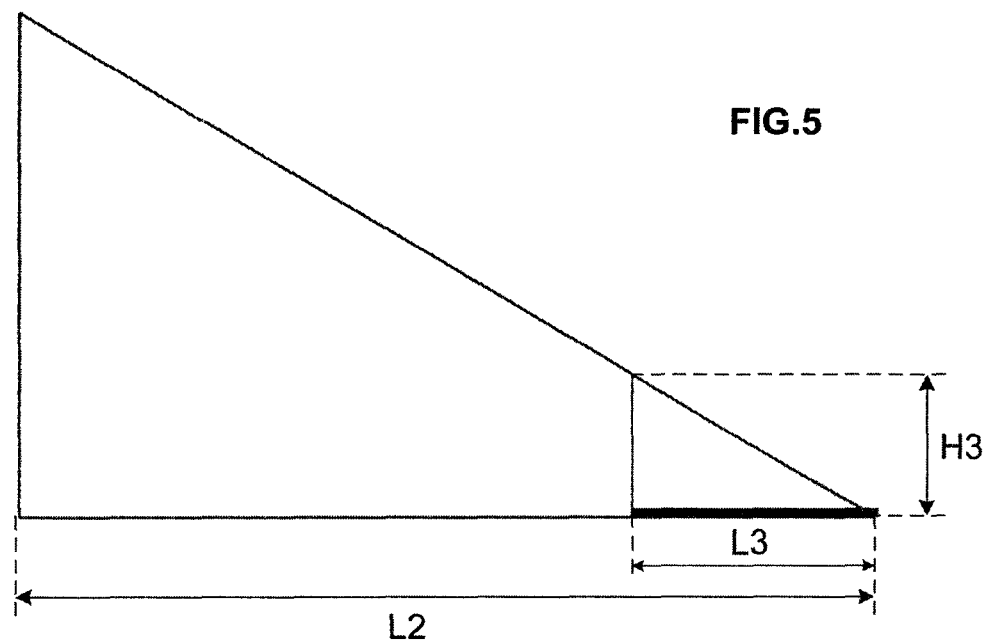
FIG. 5 is a schematic representation of the distance between the point on the surface onto which the viewing point is projected and the upper end furthest from the transformation of the image in relation to said viewing point, of the lateral transformation length of the image and the height of the virtual representation of the image.

Basically, the computer program uses for the system requires the following input parameters to obtain the output parameters of the transformation:

a desired height H3 (see FIG. 5) of the virtual representation to the observer 31 of the image vertical apparent on the surface of the playing field;

a proportion P (see FIG. 2) of the advertising image 20 initial before transformed, i.e. the ratio between the height H1 of the image and the length L1, a width H2 (see FIGS. 3, 1 and 6) desired to the transformed image;—the distance A (see FIG. 3) between the point on the surface of the playing field onto which the appropriate viewing point is orthogonally projected and the projection of the upper end furthest from the transformation of the image on the Y axis, which runs in the same direction as the halfway line on the playing field. Therefore, said distance corresponds to the sum of the separation distance between the point on the playing field onto which the appropriate viewing point is projected and the touchline, the distance corresponding to the width of the court, the distance between the opposite lateral line and baseline of the transformation, and the width of the transformation of the image (it is known prior to obtaining the transformation, from the available space between the sideline and the stands);

the distance B (see FIG. 3) between the point on the surface onto which the appropriate viewing point is projected and the projection of the upper end furthest from the transformation of the image on the X axis, which runs in the same direction as the lateral lines of the playing field. Therefore, said distance is the distance between the halfway line and any of the baselines.

The distances A and B are resulting from the observer's position 31 final (in this case the television camera of the basketball court).

From all the parameters described, it is now possible to obtain the transformation of the advertising image, according to the system of the invention.

Figure 2:
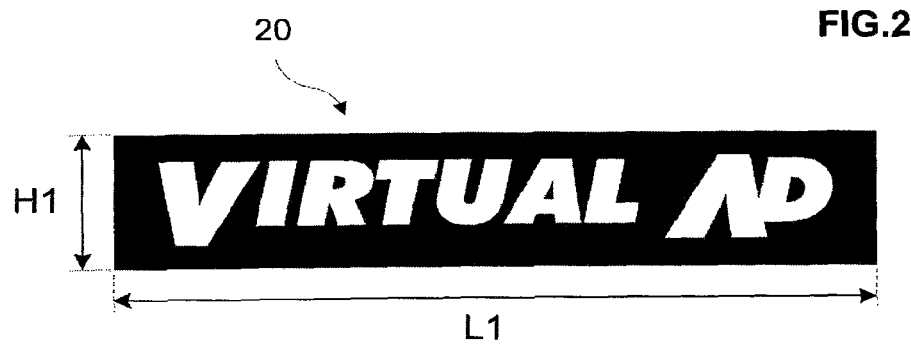
FIG. 2 is a graphic representation of the image onto which the system for obtaining a transformation thereof is applied, according to the invention.
Figure 3:
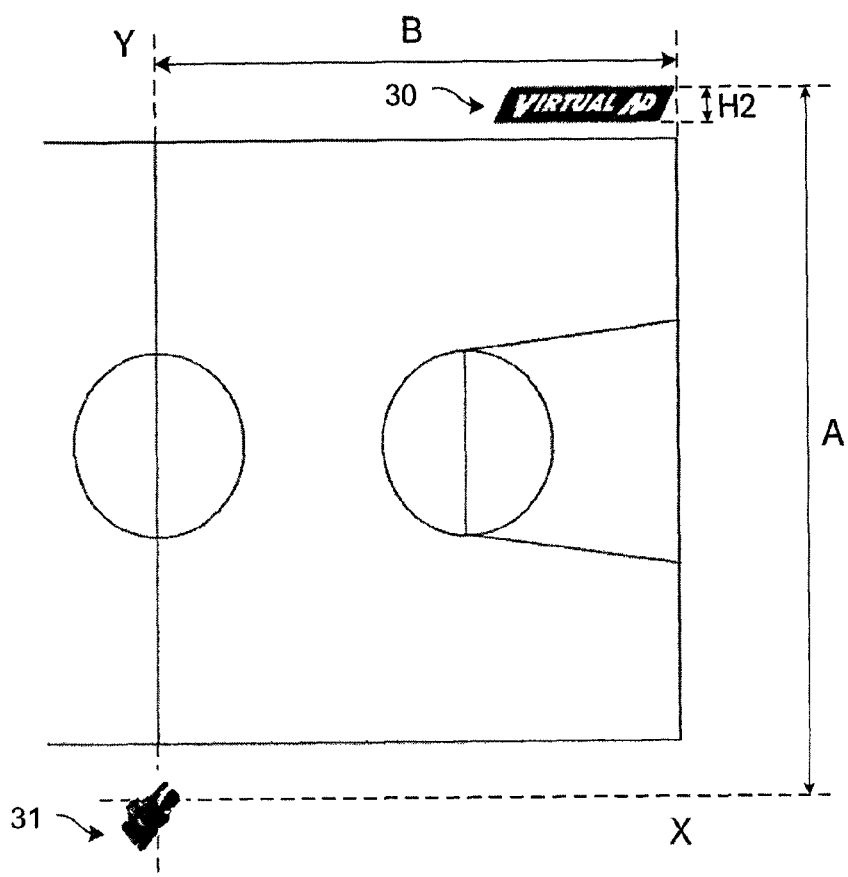
FIG. 3 is a schematic representation of a basketball court in which it is intended to arrange, on one side of the court, an advertising medium obtained from the system for obtaining an advertising medium or similar. According to the invention.

Thus, the system for obtaining the transformation of the advertising image in FIG. 2 comprises the following stages:

capture or introduce a proportion P of the advertising image 20;

capture or introduce a desired height H3 of the virtual representation vertical apparent of the advertising image, in relation to the surface of the playing field.

capture or introduce the parameters necessary to determine distance A between the point on the surface of the playing field onto which the appropriate viewing point is orthogonally projected and the projection of the upper end furthest from the transformation of the image on the Y axis. Therefore, in the preferred embodiment herein it would be the separation distance between the point on the playing field onto which the appropriate viewing point is projected and the touchline, the distance corresponding to the width of the playing field, the distance between the opposite lateral line and baseline of the transformation, and the width H2 of the transformation of the image. Obviously all these values are known beforehand;

capture or introduce the parameters necessary to determine distance B between the point on the surface onto which the appropriate viewing point is projected and the projection of the upper end furthest from the transformation of the image on the X axis. Thus, in the preferred embodiment herein, it corresponds to the distance between the halfway line of the playing field and any of the baselines;

obtain the first transformation angle $\dot{\alpha}$ of the advertising image 10 (that is to say, the transformation angle on the right side of the transformation), from distance A and distance B. More specifically, shown in FIG. 4, said angle is obtained from the following expression, based on the fact that a right-angled triangle is determined between the point on the surface onto which the appropriate viewing point is projected, the distances A and B, and the upper end of the transformation (it is noted that this point is arranged on extension of the baseline) furthest from the camera:

$\tan \alpha = B/A$

Figure 4:
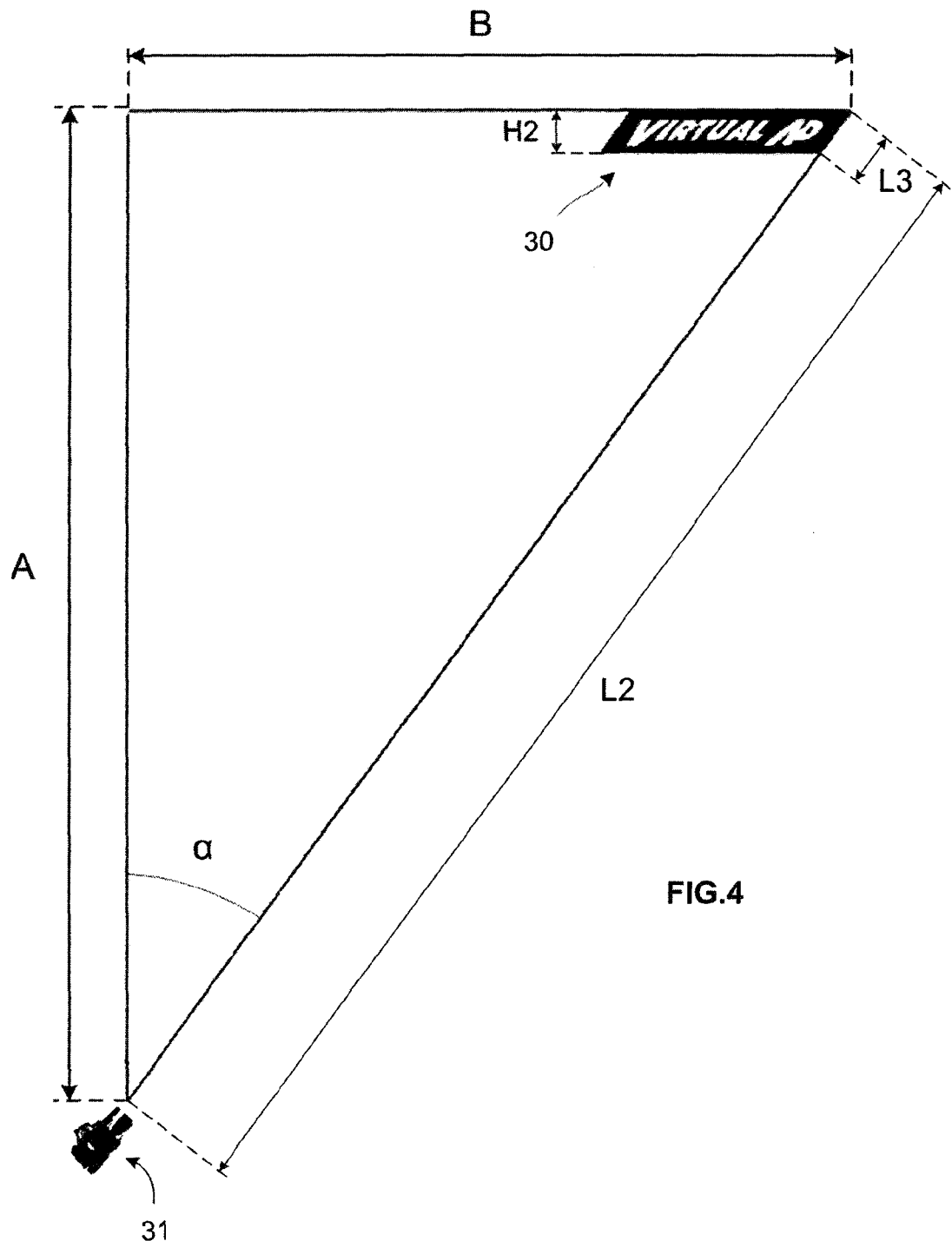
FIG. 4 is a schematic representation of the distances required in relation to the basketball court in FIG. 3, for the first transformation angle of the image of FIG. 2.

Since the parameters A and B are known, the value of angle $\dot{\alpha}$ is obtained, which is the distortion angle from the right side of the advertising image;

obtain the length L3 of the right side of the transformation of the image, from the angle $\alpha$. and the width H2 of the transformation (see FIG. 4). Therefore, the length of the right side of the transformation can be obtained from the following expression:

$\sin \alpha = H2/L3$ $L3 = H2/\sin \alpha$

Figure 6:
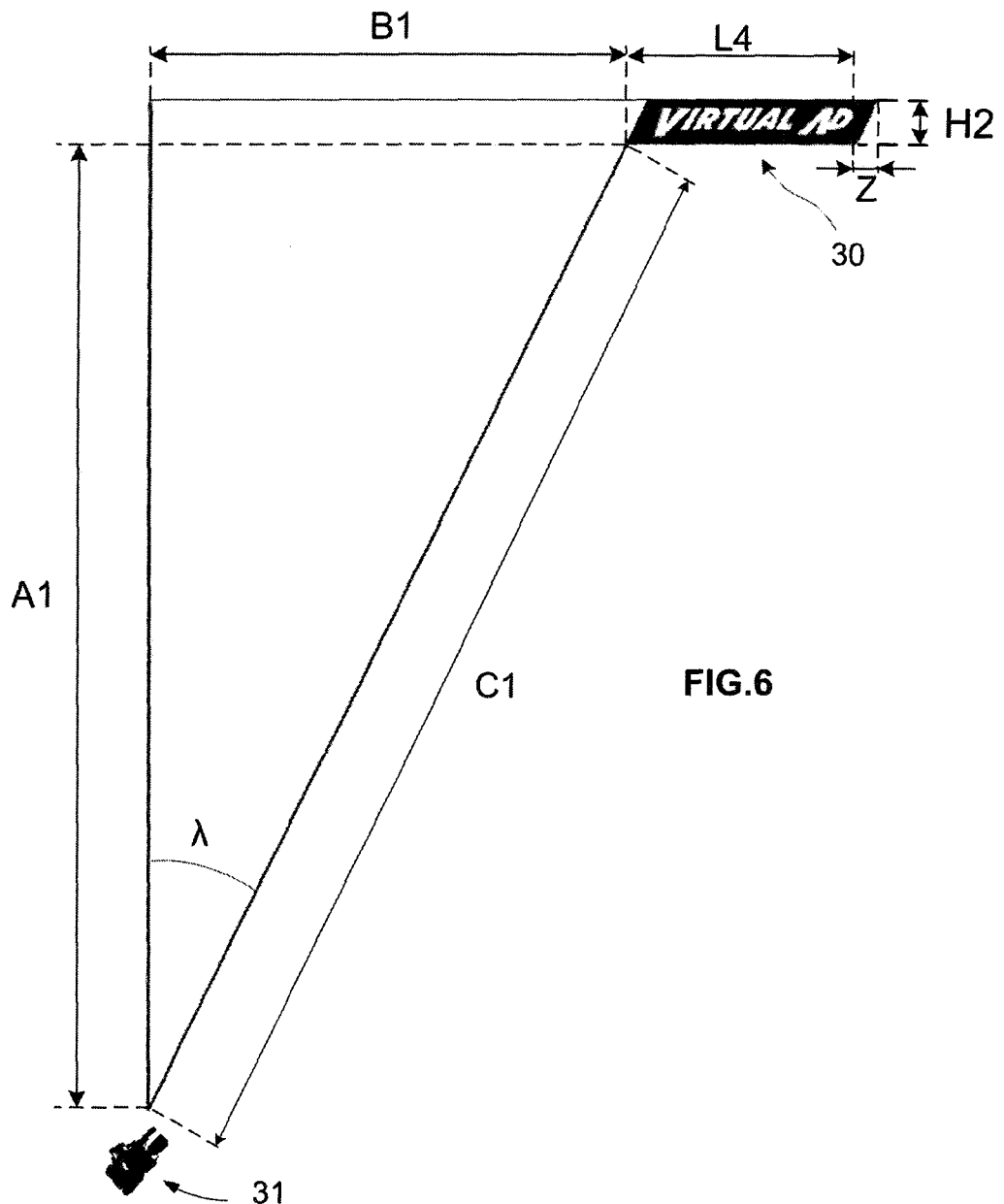
FIG. 6 is a schematic representation of the distances required in relation to the basketball court in FIG. 3, to obtain a second transformation angle of the image in FIG. 2.
Figure 7:
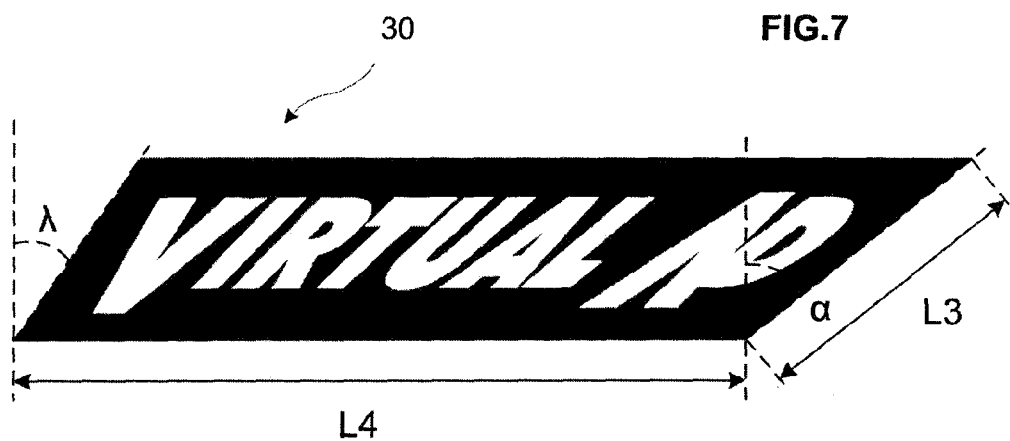
FIG. 7 is a graphical representation of the transformation of the image in FIG. 2, obtained from the system for obtaining the transformation of an image, according to the invention.

Since the angle $\dot{\alpha}$ and the width H2 of the transformation are known, the value of the length L3 on the right side of the transformation can be obtained;

obtain the length L4 of the base of the transformation (see FIGS. 4 and 6), from the used proportion P of the advertising image and the height H3 of the virtual representation of the image:

$P = L4/H3$ $L4 = P \times H3$ obtain the second angle $\lambda$, of the transformation of the image (that is to say, the transformation angle of the left side of the transformation). As can be seen in FIG. 6, said transformation angle is obtained from the viewpoint of a new right-angled triangle between the point on the surface onto which the appropriate viewing point is projected and the distances on the X and Y coordinates between said point and the lower end closest to the transformation. So, the angle áç, is obtained from the expression.

$\tan \lambda = B1/A1$ where A1 is the distance corresponding to the coordinate on the Y axis of the lower end closest to the transformation and B1 is the distance corresponding to the coordinate on the X axis of the lower end closest to the transformation. More specifically, A1 is the sum of the distances of separation between the point on the playing field onto which the appropriate viewing point is projected and the touchline, the distance corresponding to the width of the playing field, the distance between the opposite lateral line and the baseline of the transformation (or the same which is, distance A less the width of the transformation H2); while B1 corresponds to the previously obtained distance B, which the length L4 of the base of the transformation 30 and a parameter Z is subtracted, which is nothing more than the distance on the X axis between the upper end furthest from the transformation and the lower end closest to the bottom thereof, so, $\tan \alpha = Z/H2$ $Z = H2 * \tan \alpha$ From these values obtained, the computer or personal computer of the system of the invention, uses a computer program, and generates the transformation of the original advertising image and ensures that said transformation is printed onto an appropriate medium, for example, a canvas, which will be subsequently arranged in the proper position on the surface of the playing field.

Figure 8:
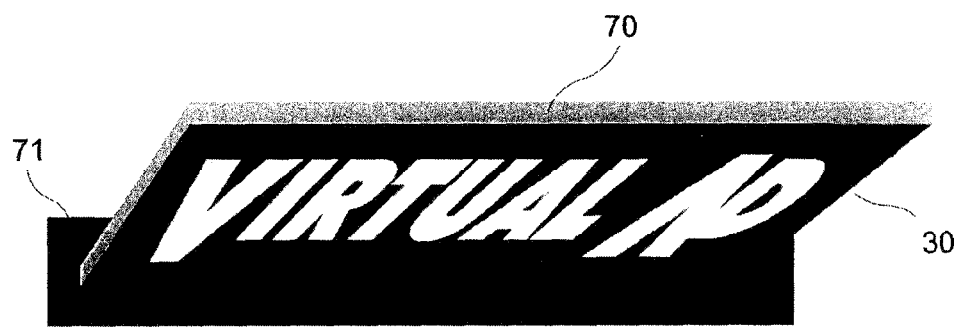
FIG. 8 is a graphical representation of the advertising medium comprising the transformation of the image in FIG. 7, one element by way of a medium and one element by way of a shadow of the transformation.

Furthermore, as can be seen in FIG. 8, the advertising medium may comprise (printed on the medium), as well as the transformation of the advertising image 30, an element 71 which acts as a base and an element 70 which acts as a shadow, such that when the virtual representation of the image appears to be in a position perpendicular to the surface onto which the transformation of the image is arranged, the element as a base appears to be the base on which the virtual representation of the image is supported, while the element as a shadow appears to give a three-dimensional virtual representation of the image.

Obviously, an advertising medium can be obtained that comprises only the element 71 as a base or that comprises only the element 70 as a shadow of the transformation of the image, or does not comprise either of them. The transformation of the image 30 is sufficient to achieve the desired result.

Figure 9:
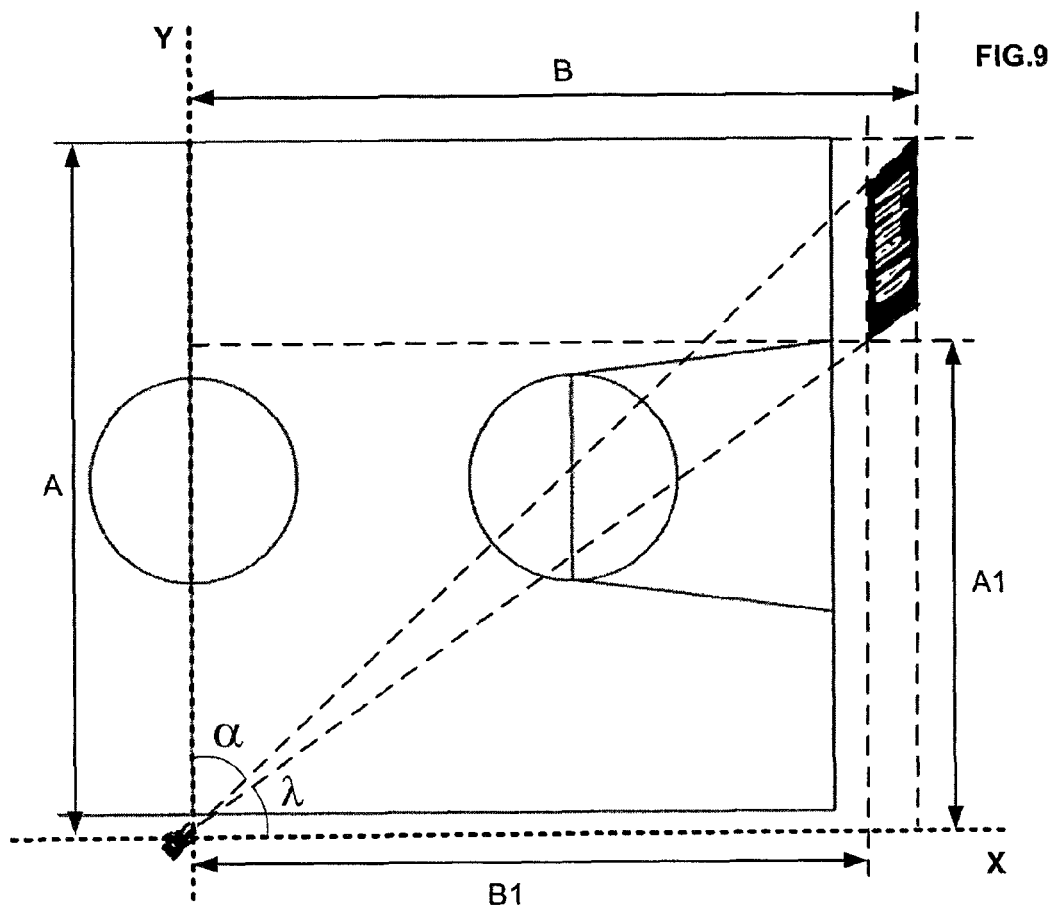
FIG. 9 is a schematic representation of a basketball court in which it is intended to provide, at one end of the court, an advertising medium obtained from the system for obtaining an advertising medium or similar, according to the invention.

FIG. 9 shows, by way of example, that the system of the invention described above could also applied to obtain the transformation 30 of the advertising image 20 in FIG. 2 to be arranged at the end of the playing field that is located to the right of the camera. More specifically, in this case, the upper end further from the transformation of the image in relation to the appropriate viewing point should be arranged on the extension of the lateral line of the playing field furthest from the viewing point. In addition, the advertising medium is arranged at a predefined distance from the baseline.

Additionally, FIG. 9 shows some of the major horizontal dimensions (distances and angles) involved in the system of the invention for obtaining an appropriate medium that can be arranged at the bottom of the playing field.

The first transformation angle ($\dot\alpha$) of the image;

The distance (A) corresponding to the coordinate of the upper end furthest from the transformation of the image in relation to said viewing point on the first axis of the coordinate axes (Y);

The distance (B) corresponding to the coordinate of the upper end furthest from the transformation of the image in relation to the viewing point on the second axis of the coordinate axes (X);

The second transformation angle (A) of the image;

The distance (A1) corresponding to the coordinate of the lower end closest to the transformation of the image in relation to the viewing point on the first axis of the coordinate axes (Y);

The distance (B1) corresponding to the coordinate of the lower end closest to the transformation of the image in relation to the viewing point on the second axis of the coordinate axes (X);

The fact that the advertising medium is arranged on a basketball court and that the upper end furthest from the transformation of the image is arranged on the extension of the lateral line of the court, enables some of the known distances to be taken advantage of, such as the width of the court or the distance between the halfway line and baselines.

In the event that the medium is arranged in an area devoid of known distances, such as for example a commercial premises, obtaining the required distances can be obtained manually.

Figure 10:
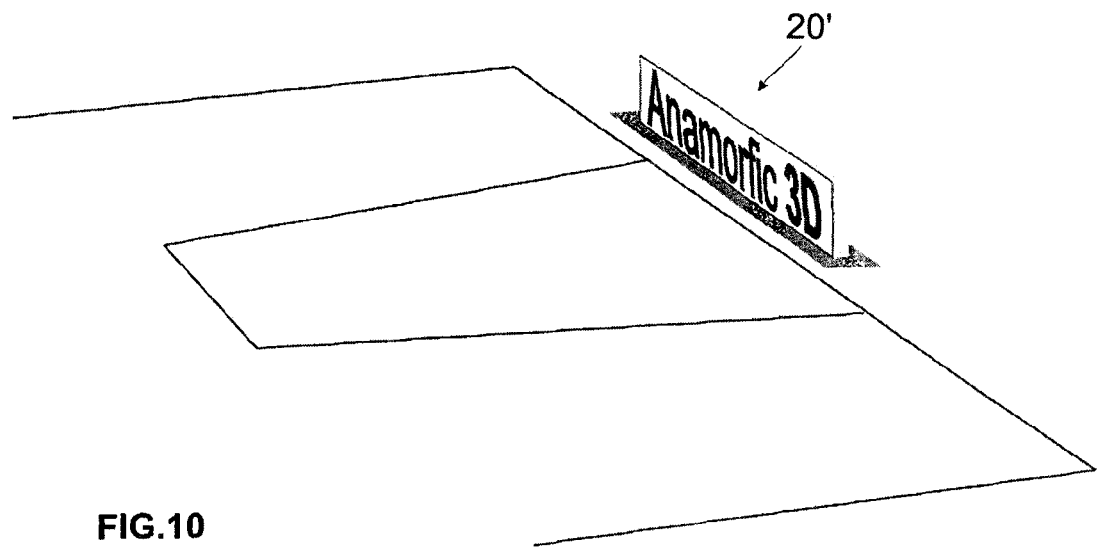
FIG. 10 is a schematic three-dimensional representation of a basketball court in which a virtual representation of an advertising image ("ANAMORFIC 3D") generated from a transformation of the image is shown, such as that shown in FIG. 8.

FIG. 10 shows a virtual representation 20' of an advertising image ("ANAMORFIC 3D"), as would be seen on television (when the image is captured by a television camera) or as would be seen by certain spectators in the sports arena.

Although it has been described and illustrated in one specific embodiment of the invention herein, it is clear that a person skilled in the art could introduce variants and modifications, or replace with other technically equivalent details without departing from the scope of protection defined by the claims attached.

The computer program used can be in the form of a source code, object code or intermediate code between source code and object code such as in a partially compiled form, or any other form suitable for use in the implementation of the processes according to the invention. Said computer program is not the object of the present invention.

The carrier medium can be any entity or device capable of carrying the program, and it is not the object of the present invention.

For example, the carrier medium may comprise a medium for storage such as a ROM, for example a CD ROM or a semiconductor ROM or magnetic recording medium, such as a floppy disc or a hard drive. In addition, the carrier medium can be a transmissible carrier such as an electrical or optical signal that can be transmitted via optical or electrical cable or by radio or other media.

When the computer program is contained in a signal that can be transmitted directly via a cable or other device or medium, the carrier medium can be constituted by said cable or other device or medium.

Alternatively, the carrier medium can be an integrated circuit in which the computer program is embedded, said integrated circuit being adapted to perform, or for use in performing the relevant processes.

The invention claimed is:

1. A system for obtaining a transformation of an image, such that when said transformation is arranged on a surface that forms a horizontal plane and is seen by an observer from at least one appropriate viewing point wherein the transformation of the image does not depend on the height position of the observer with respect to the horizontal plane, a virtual representation of the image appears in a position perpendicular to the surface onto which it is arranged, wherein the system comprises means for capturing a image proportions to be transformed; means for capturing a width that the transformation of the image should have; means for capturing a height of the virtual representation of the image should have; means for establishing coordinate axes at the point on the surface onto which the viewing point is orthogonally projected, with said coordinate axes on the same horizontal plane corresponding to the surface on which the transformation of the image is arranged; and comprising a computer equipped with a program for obtaining:

a first transformation angle of the image from at least two of the following parameters: the distance between the point on the surface onto which the viewing point is projected and the upper end furthest from the transformation of the image in relation to said viewing point; the distance corresponding to the coordinate of the upper end furthest from the transformation of the image in relation to said viewing point, on a first axis of the coordinate axes; and the distance corresponding to the coordinate of the upper end furthest from the transformation of the image in relation to said viewing point, on a second axis of the coordinate axes;

a lateral transformation length of the image from the first transformation angle of the image and the width the transformation of the image should have;

a transformation length of the image from the used proportion of the image and the used height of the virtual representation of the image;

a second transformation angle of the image from at least two of the following parameters, the distance between the point of the surface onto which the viewing point is projected and said lower end closest to the transformation of the image in respect of said viewing point; the distance corresponding to the coordinate of the lower end closest to the transformation of the image in relation to said viewing point, on the first axis of the coordinate axes; and the distance corresponding to the coordinate of the lower end closest to the transformation of the image in relation to said viewing point, on the second axis of the coordinate axes.

2. The system of claim 1, wherein the observer is a television camera.

3. A system for obtaining an advertising medium, comprising a system for obtaining the transformation of an image according to claim 1, from which the transformation of an advertising image is obtained, and means for printing the transformation of the advertising image onto a medium.

* * * * *